United States Patent [19]

Majewicz

[11] 4,400,502

[45] Aug. 23, 1983

[54] READILY DISPERSIBLE ANIONIC, WATER-SOLUBLE CELLULOSE DERIVATIVES AND A METHOD FOR THEIR PREPARATION

[75] Inventor: Thomas G. Majewicz, Chadds Ford, Pa.

[73] Assignee: Hercules Incorporated, Wilmington, Del.

[21] Appl. No.: 372,357

[22] Filed: Apr. 27, 1982

[51] Int. Cl.$^3$ .................... C08B 11/193; C08B 11/20
[52] U.S. Cl. ........................................ 536/87; 536/85; 536/91; 536/98
[58] Field of Search ....................... 536/85, 87, 91, 98

[56] References Cited

U.S. PATENT DOCUMENTS

| | | | |
|---|---|---|---|
| 3,072,635 | 1/1963 | Menkart et al. | 536/87 |
| 3,297,583 | 1/1967 | Dierichs et al. | 252/363.5 |
| 3,356,519 | 2/1964 | Chambers et al. | 106/187 |
| 4,298,728 | 11/1981 | Majewicz et al. | 536/91 |
| 4,306,061 | 12/1981 | Majewicz | 536/98 |
| 4,309,535 | 1/1982 | Majewicz | 536/85 |

*Primary Examiner*—Ronald W. Griffin
*Attorney, Agent, or Firm*—Joanne L. Horn

[57] ABSTRACT

Anionic, water-soluble cellulose ethers which are treated with a mixture of glyoxal and a sodium borate, preferably borax, readily disperse in aqueous solutions without clumping or agglomerating. These treated compounds can be formed by contacting an organic slurry of an anionic, water-soluble cellulose ether with an aqueous solution of glyoxal and a sodium borate, recovering the product and then drying it.

11 Claims, No Drawings

READILY DISPERSIBLE ANIONIC, WATER-SOLUBLE CELLULOSE DERIVATIVES AND A METHOD FOR THEIR PREPARATION

This invention relates to anionic, water-soluble polymers having improved dispersibility in aqueous media and a method for preparing the same. In a specific embodiment, it relates to improving the dispersibility of particulate, anionic, water-soluble cellulose ethers via a treatment thereof with a mixture of glyoxal and a sodium borate.

Virtually all particulate, water-soluble polymers are to some extent difficult to disperse in water. This difficulty is due to their great affinity for water. The particles' hydrophilicity leads to rapid hydration of their surface, as a result of which they become sticky and adhere to one another, forming clumps or agglomerates which are difficult to separate. Agglomeration leads to slow dissolution even when the clumps of particles are subjected to vigorous, high shear agitation.

A variety of techniques have been proposed in the art to correct the stated problem. For example, U.S. Pat. No. 3,072,635 to Menkart et al. teaches that dispersibility of particulate, water-soluble cellulose ethers can be improved by treating their surface with a polyfunctional aldehyde, in particular, glyoxal. This treatment works well and has, in fact, become a standard treatment applied to millions of pounds of water-soluble cellulose ethers each year. However, the treatment works well only with nonionic ethers such as methyl cellulose, hydroxypropyl methyl cellulose, and hydroxyethyl cellulose. With anionic ethers such as carboxymethyl cellulose and carboxymethyl hydroxyethyl cellulose it is relatively unsatisfactory.

To date the best dispersibility treatment disclosed for particulate, anionic, water-soluble cellulose ethers has been that disclosed by Majewicz in U.S. Pat. No. 4,309,535. This reference teaches that particulate carboxymethyl cellulose or other water-soluble anionic ethers can be made dispersible by a treatment with an aluminum salt. This treatment forms a crosslink network on the polymer surface sufficient to delay hydration and permit a charge of polymer to be dispersed throughout an aqueous medium before the particle surfaces become sticky and form clumps. Complete dissolution can thereafter be aided by the addition of an aluminum chelant to remove the aluminum ion from the polymer, thereby breaking the insoluble crosslinks on the particle surface.

There are times when it is inconvenient to use the treatment according to U.S. Pat. No. 4,309,535. For example, one large volume application for anionic, water-soluble polymers is their use in oil well fracturing fluids, but is often inconvenient to carry out the polymer dissolution for it requires not only that the anionic, water-soluble polymer, but that an aluminum chelant be added to the fluid.

Use has heretofore been made of both glyoxal and borate ion, singly, to improve dispersibility of water-soluble polysaccharides. Reference has been made hereinabove to the use of glyoxal, by itself, as a dispersibility treatment for cellulose esters. It is also known that the dispersibility of some other water-soluble polysaccharides, e.g. hydroxypropyl guar gum, is improved by the presence of borate.

Neither of these reagents, however, is by itself satisfactory for use with anionic, water-soluble cellulose ethers. It is postulated that glyoxal treatment is unsuccessful because it is carried out under acidic conditions and under even mildly acidic conditions anionic, water-soluble cellulose ethers are highly susceptible to ester or acetal crosslinking when exposed to heat, such as occurs during drying of the treated product. Heat treatment of glyoxal-only treated anionic water-soluble ethers can lead to poor solution quality when the glyoxal treated polymer is subsequently added to an aqueous medium.

Sodium borates are unsatisfactory when used alone because they owe their effectiveness to their ability to react with cis-diol groups. Such groups are not always present in the anionic, water-soluble cellulose ethers encompassed by this invention.

It is the object of this invention to provide treated, anionic, water-soluble cellulose ethers which disperse readily in aqueous media.

A further object of the invention is to provide a simple method of preparing readily dispersible, anionic, water-soluble cellulose ethers.

These and other objects are realized by contacting an anionic, water-soluble cellulose ether with an aqueous solution containing glyoxal and a sodium borate, recovering the resulting product and then drying it.

The method of the invention is especially well suited to the treatment of particulate carboxymethyl cellulose (hereinafter referred to as CMC) and carboxymethyl hydroxyethyl cellulose (hereinafter referred to as CMHEC). Both of these materials are widely used as thickeners for aqueous systems and both are subject to the dispersibility problems discussed previously.

The CMC which is treated can be any of the water-soluble species having a degree of substitution (hereinafter referred to as D.S.) of about 0.4 to 1.2. D.S. is a term well known in the art. It is defined as the average number of hydroxyl groups per cellulosic anhydroglucose unit at which substitution has taken place.

The CMHEC can be either a hydroxyethylated CMC or carboxymethylated hydroxyethyl cellulose. That is to say, either the hydroxyethyl or the carboxymethyl group can predominate as the moiety which imparts water-solubility. Thus, the invention encompasses a material having carboxymethyl D.S. between about 0.2 and 0.9 and a hydroxyethyl molar substitution (hereinafter referred to as M.S.) of about 0.4 to about 3 so long as at least one of the substituting moieties is within the range that imparts water-solubility. M.S., a term which is also well known in the art, defines the average number of molecules of hydroxylethyl moiety incorporated per cellulosic anhydroglucose unit.

The size of the particles to be treated is not critical. It is possible to employ particles of all the usual range of sizes of commercially available anionic, water-soluble cellulose ethers, i.e. between 20 and 350 mesh U.S. sieve standard.

The aqueous solution used to treat the anionic, water-soluble cellulose ether contains glyoxal and a sodium borate. An example of a preferred sodium borate is sodium tetraborate decahydrate, commonly known as borax. In general, it is desirable to use only as much water as is necessary to dissolve the glyoxal and the sodium borate. While more than this minimum amount may be employed it makes the later step of drying the ethers more difficult.

It is essential that the two reagents be dissolved together prior to being brought into contact with the cellulose ether. Individual addition of the reagents is ineffective in producing the desired result. Furthermore, the reagents cannot be added to the polymer in dry state and permitted to dissolve when the polymer is charged to the aqueous system to be thickened therewith. It is thought that the glyoxal and the sodium borate react in aqueous medium to form a complex and that this complex is necessary in the treatment of the anionic, water-soluble ethers.

In the preferred embodiment, the aqueous glyoxal-borate solution is added to a slurry of the anionic, water-soluble cellulose ether in a water miscible diluent which is not a solvent for the cellulose ether. The diluent should be one which does not react with the glyoxal. A small amount, up to about 20%, of water may be contained in the diluent so long as it does not lead to appreciable solubility of the cellulose ether. In fact, it has been found that for certain water-soluble cellulose ethers, particularly for CMC, the addition of a small amount of water facilitates the treatment. For most water-soluble ethers the preferred diluent is acetone or acetone-water mixtures. The best solvent for use with a given water-soluble cellulose ether will be readily determinable by one skilled in the art. The amount of diluent is not critical except that there must be a sufficient amount to provide a slurry that can be stirred.

Methods other than slurrying, such as spraying, for contacting a particulate anionic cellulose ether with an aqueous solution are known to those skilled in the art and can be employed in accordance with the method of this invention.

A prime consideration in selecting the proper proportions of anionic, water-soluble cellulose ether, glyoxal and sodium borate is the ratio of the glyoxal to the sodium borate. It is preferred that there be sufficient sodium borate to complex most of the glyoxal. When borax is used, the possible ratios of borax to glyoxal, based on the weights of both, range from about 0.5:1 to about 5:1, with the preferred ratio being from about 1:1 to about 2:1. It has been found that as the ratio increases, that is, as the relative amount of borate is increased, the time necessary for the particles to hydrate decreases and the thermal stability of the product is increased.

The minimum amount of glyoxal which can be used is about 0.1 percent by weight. Preferably the amount used is from about 0.2 to about 0.5 percent by weight based on the weight of dry anionic, water-soluble cellulose ether.

The combined ingredients are then agitated to allow contact between the water-soluble cellulose ether and the glyoxal-sodium borate mixture. Time is not critical so long as sufficient time is allowed for complete contact. It can be from about fifteen to about sixty minutes. Thirty minutes of agitation has been found to be consistently satisfactory. The agitation can be carried out at ambient temperature.

The production resulting from agitation of the mixture is then recovered by conventional means and finally, dried. It is an unexpected advantage of this invention that the product is less heat sensitive than is the product of the analogous treatment using only glyoxal. Consequently, the drying can be carried out under less controlled and a greater variety of conditions than has heretofore been possible. The product can be dried at elevated temperatures until the desired moisture content has been reached. When higher temperatures are required they should be employed for correspondingly shorter periods of time and when long periods of drying are required, they should be carried out at moderate temperatures. The conditions to be used in a particular situation will be apparent to one skilled in the art.

The invention is illustrated by the following examples, but is not to be limited thereby. All ratios are based on weight unless otherwise indicated.

EXAMPLES 1 THROUGH 10

In examples 1 through 10, 25 g, dry weight, of CMHEC having a carboxymethyl D.S. of 0.4 and a hydroxyethyl M.S. of 2.0 were slurried using 97 ml of 99+% acetone as the diluent. Sufficient amounts of an aqueous 40% glyoxal solution and of borax were added to 3 ml of water so that the weight percentages shown in Table 1 resulted when the glyoxal-borax solutions were added to the acetone CMHEC slurry. Each mixture was stirred for 30 minutes, filtered and the product dried for two hours under the conditions listed in Table 1. Dispersibility was determined by the rapid addition of 1.14 g of CMHEC to 200 ml of a 2% potassium chloride solution in a 500 ml glass Berzelius beaker. The mixture was stirred at 300 RPM with an H bar stirring rod attached to a high torque stirring motor. The dispersibility of the sample was evaluated after about ten seconds. The resulting solution characteristics are reported in Table 1. It is apparent that the glyoxal-borax treatment provides excellent dispersibility without sacrificing other solution qualities.

TABLE 1

| Example | Wt % Glyoxal (a) | Wt % Borax (a) | Dispersibility (b) | 1% Solution Characteristics | | |
|---|---|---|---|---|---|---|
| | | | | Viscosity (c) | Turbidity (d) | Quality (e) |
| 1 (f) | 0 | 0.25 | poor | 1200 | Cl | Sm |
| 2 (f) | 0.2 | 0 | poor | 1260 | SH | Sm |
| 3 (f) | 0.1 | 0.1 | excellent | 1220 | Cl | Sm |
| 4 (f) | 0.1 | 0.25 | excellent | 1200 | Cl | Sm |
| 5 (f) | 0.5 | 0.5 | excellent | 1220 | SH | Sm |
| 6 (f) | 1.0 | 0 | excellent | 400 | H | St |
| 7 (g) | 1.0 | 0.25 | excellent | 1200 | SH | Sm |
| 8 (g) | 1.0 | 0.5 | excellent | 1200 | SH | Sm |
| 9 (g) | 1.0 | 1.0 | excellent | 1200 | SH | Sm |
| 10 (g) | 1.0 | 0 | excellent | 1320 | SH | St |

(a) Weight percent based on CMHEC
(b) excellent = complete particle dispersion, no clumps or gels; good = few small clumps or gels; fair = many small to large clumps or gels; poor = many large clumps or gel
(c) 1% Brookfield viscosity, 25° C., 30 rpm
(d) Cl = clear; SH = slightly hazy; H = hazy
(e) Sm = smooth solution; St = structured solution
(f) dried in vacuo at 105° C.
(g) dried in a convection oven at 105° C.

EXAMPLES 11 THROUGH 13

In examples 11 through 13, 15 grams, dry weight, of CMHEC having a carboxymethyl D.S. of 0.8 and hydroxyethyl M.S. of 0.5 were prepared using the same procedure as in examples 1–10, except that the samples were dried for 8 hours at 55° C. in a forced hot air oven. The results are shown in Table 2.

TABLE 2

| Example | Wt % Glyoxal (a) | Wt % Borax (a) | Dispersibility (b) | 1% Solution Characteristics | | |
|---|---|---|---|---|---|---|
| | | | | Viscosity (c) | Turbidity (d) | Quality (e) |
| 11 | 0 | 0 | poor | 1864 | SH | Sm |
| 12 | 0.1 | 0.25 | excellent | 1668 | SH | Sm |
| 13 | 0.5 | 0.5 | excellent | 1676 | SH | Sm |

(a) Weight percent based on CMHEC
(b) excellent = complete particle dispersion, no clumps or gels; good = for small clumps or gels; fair = many small to large clumps or gels; poor = many large clumps or gel
(c) 1% Brookfield viscosity, 25° C., 30 rpm
(d) Cl = clear; SH = slightly hazy; H = hazy
(e) Sm = smooth solution

EXAMPLES 14 THROUGH 16

In examples 14 through 16, 25 grams, dry weight of CMC having a carboxymethyl D.S. of 0.75 was slurried using 90 ml of acetone plus 7 ml of H$_2$O. Sufficient amounts of an aqueous 40% glyoxal solution and of borax were added to 3 ml of water so that the weight percentages shown in Table 1 resulted when the glyoxal borax solution was added to the CMC slurry. The mixture was stirred for 30 minutes and the product dried for 2 hours at 105° C. in vacuo. Dispersibility was determined by the rapid addition of 1.14 grams of CMC to 200 ml of 2% potassium chloride solution in a 500 ml glass Berzelius beaker. The mixture was stirred at 300 RPM with an H bar stirring rod attached to a high torque stirring motor. The dispersibility of the sample was evaluated after about 10 seconds. The resulting solution characteristics are reported in Table 3.

TABLE 3

| Example | Wt % Glyoxal (a) | Wt % Borax (a) | Dispersibility (b) | 1% Solution Characteristics | | |
|---|---|---|---|---|---|---|
| | | | | Viscosity (c) | Turbidity (d) | Quality (e) |
| 14 | 0.3 | 0.3 | excellent | 1160 | Clear | Sm |
| 15 | 0.3 | 0.5 | good | 1320 | Clear | Sm |
| 16 | 0.3 | 0 | excellent | 1400 | Clear | St |

(a) Weight percent based on CMC
(b) excellent = complete particle dispersion, no clumps or gels; good = for small clumps or gels; fair = many small to large clumps or gels; poor = many large clumps or gel
(c) 1% Brookfield viscosity, 25° C., 30 rpm
(d) Cl = clear; SH = slightly hazy; H = hazy
(e) Sm = smooth solution, St = structured solution

EXAMPLES 18 THROUGH 21

For each example 1.2 g of CMHEC having a carboxymethyl D.S. of 0.4 and a hydroxyethyl M.S. of 2.0, treated in the manner indicated in Table 4, was rapidly added to 250 ml of 2% potassium chloride solution in a 500 ml Waring Blender and stirred at 1500 rpm. Any lumping of the sample was noted. After mixing for 45 seconds, 175 ml of the mixture was poured into a 200 ml beaker and positioned in a Model 35 Fann viscometer. The samples were stirred at 300 rpm. Viscosity readings were made at 1, 2, 3, 4, 5, 10, 20 and 30 minutes. The results are shown in Table 4 and indicate the treatment with a glyoxal borax solution is not detrimental to the rate at which CMHEC will go into solution.

TABLE 4

| Example | 1 min. | 2 min. | 3 min. | 4 min. | 5 min. | 10 min. | 20 min. | 30 min. | Full Viscosity |
|---|---|---|---|---|---|---|---|---|---|
| Fann Viscosities (300 rpm)-cps | | | | | | | | | |
| 18[1] | 13 | 14 | 14 | 16 | 17 | 17 | 18 | 18 | 29 |
| 19[2] | 11 | 16 | 20 | 22 | 24 | 28 | 31 | 32 | 32 |
| 20[3] | 10 | 14 | 18 | 20 | 21 | 24 | 25 | 26 | 26 |
| 21[4] | 13 | 20 | 26 | 28 | 29 | 31 | 31 | 31 | 31 |
| Percentage of Final Viscosity | | | | | | | | | |
| 18[1] | 45 | 48 | 48 | 55 | 59 | 59 | 62 | 62 | |
| 19[2] | 34 | 50 | 63 | 69 | 75 | 88 | 97 | 100 | |
| 20[3] | 38 | 54 | 70 | 77 | 81 | 92 | 95 | 100 | |
| 21[4] | 42 | 64 | 84 | 90 | 94 | 100 | 100 | 100 | |

[1] Untreated with many lumps observed
[2] Treated with 0.52% glyoxal/0.83% borax. No lumps were observed.
[3] Treated with 0.32% glyoxal/0.51% borax. No lumps were observed.
[4] Treated with 0.23% glyoxal/0.37% borax. Few small lumps were observed.

EXAMPLES 22 THROUGH 24

The treated CMHEC of examples 22 through 24 was prepared by combining 50 lbs., dry weight, of CMHEC having a carboxymethyl D.S. of 0.4 and hydroxyethyl M.S. of 2.0 with about 30 gallons 97% acetone. A borax-glyoxal solution containing 108 g borax, 170 g of an aqueous 40% glyoxal solution and 500 g water was added to the CMHEC-acetone slurry. After addition of the solution the CMHEC slurry was stirred for 30 minutes, filtered and dried to a moisture content of 3.2 at 74°–79° F. under vacuum. The vacuum was then removed and the products further dried for the time indicated in Table 5. The examples illustrate treated CMHEC's excellent heat stability at elevated temperatures.

TABLE 5

| Example | Wt % Glyoxal (a) | Wt % Borax (a) | Drying Conditions | | 1% Solution Characteristics | | | |
|---|---|---|---|---|---|---|---|---|
| | | | Temperature | Time | Viscosity (b) | Turbidity (c) | Quality (d) | Granularity (e) |
| 22 | 0.3 | 0.48 | 74°–79° C. | 0 hrs | 1696 | Cl | Sm | 1+ |
| 23 | 0.3 | 0.48 | 74°–79° C. | 3 hrs | 1648 | Cl | Sm | 1 |

TABLE 5-continued

| | Wt % | Wt % | Drying Conditions | | 1% Solution Characteristics | | | |
|---|---|---|---|---|---|---|---|---|
| Example | Glyoxal (a) | Borax (a) | Temperature | Time | Viscosity (b) | Turbidity (c) | Quality (d) | Granularity (e) |
| 24 | 0.3 | 0.48 | 74°–79° C. | 6 hrs | 1564 | Cl | Sm | 2 |

(a) Weight percent based on CMHEC
(b) 1% Brookfield viscosity, 25° C., 30 rpm
(c) Cl = clear
(d) Sm = smooth solution
(e) Visual measurement of gel particles present in a wet film. 1 - lowest concentration of gel particles observed

EXAMPLES 25 THROUGH 28

The treated CMHEC of examples 25 through 28 was prepared by combining 100 g, dry weight CMHEC having a carboxymethyl DS of 0.4 and a hydroxyethyl M.S. of 2.0 with 375 ml 97% acetone. To one slurry was added an aqueous borax-glyoxal solution having a borax to glyoxal ratio of 1:1; this slurry was used for examples 25 and 26. To another slurry was added a borax to glyoxal ratio of about 1.67:1, this slurry was used for examples 27 and 28. The solution proportions were obtained by adding a sufficient amount of 10% stock solutions to provide 0.3% glyoxal and 0.3% borax or 0.3% glyoxal and 0.5% borax by weight based on the dry weight of the CMHEC. Using a maximum temperature of 65° C., the samples were dried in vacuo to moisture content of about 2.5%. Approximately 7.5 g of each sample was placed in a 4 inch polymerization tube, sealed and placed in an oven whereupon the samples were heated for 20 hours at 70° C. and 85° C. respectively. The results, listed in Table 6, illustrate: (1) the heat stability of treated CMHEC over extended periods of time; (2) the increasing stability of treated CMHEC as borax was increased from 0.3 to 0.5%, i.e. borax to glyoxal ratio increased from 1:1 to 1.6:1.

What I claim and desire to be protected by Letters of Patent is:

1. A method for making a dispersible, anionic, water-soluble cellulose ether comprising:
   (a) contacting a particulate anionic water-soluble cellulose ether with an aqueous medium prepared from water, glyoxal, and a sodium borate to form a product;
   (b) recovering the resulting product; and
   (c) drying the recovered product.
2. The method of claim 1 wherein the aqueous sodium borate-glyoxal solution contains sufficient sodium borate to complex substantially all the glyoxal.
3. The method of claim 1 wherein the sodium borate is borax.
4. The method of claim 3 wherein the borax to glyoxal ratio is from about 0.5:1 to about 5:1, based on weight.
5. The method of claim 3 wherein the borax to glyoxal ratio is from about 1:1 to about 2:1, based on weight.
6. The method of claim 1 wherein the aqueous sodium borate-glyoxal solution contains from about 0.1 to 1.0 wt% glyoxal based on the weight of anionic water-soluble cellulose ether.
7. The method of claim 1 wherein the aqueous sodium borate-glyoxal solution contains from about 0.2 to about 0.5 wt% glyoxal based on the weight of anionic water-soluble cellulose ether.
8. The method of claim 1 wherein the cellulose ether is carboxymethyl cellulose.

TABLE 6

| | Wt % | Wt % | Drying Conditions | | 1% Solution Characteristics | | | |
|---|---|---|---|---|---|---|---|---|
| Example | Glyoxal (a) | Borax (a) | Temperature | Time | Viscosity (b) | Turbidity (c) | Quality (d) | Granularity (e) |
| 25 | 0.3 | 0.3 | 70° C. | 20 hrs | 1960 | SH | Sm | 1 |
| 26 | 0.3 | 0.3 | 85° C. | 20 hrs | 2240 | SH | St | 2+ |
| 27 | 0.3 | 0.5 | 70° C. | 20 hrs | 2080 | SH | Sm | 1 |
| 28 | 0.3 | 0.5 | 85° C. | 20 hrs | 2200 | SH | Sm | 1 |

(a) Weight percent based on CMHEC
(b) 1% Brookfield viscosity, 25° C., 30 rpm
(c) SH = slightly hazy
(d) Sm = smooth solution, St = structured solution
(e) Visual measurement of gel particles present in a wet film. 1 — lowest concentration of gel particles observed 9. The method of claim 1 wherein the cellulose ether is carboxymethyl hydroxyethyl cellulose.
10. A particulate anionic water-soluble cellulose ether which has been treated with an aqueous medium prepared from water and the reaction product of glyoxal and a sodium borate.
11. The particulate anionic water-soluble cellulose ether of claim 10 wherein the sodium borate is borax.

* * * * *